(12) United States Patent
Kumazaki et al.

(10) Patent No.: US 7,753,380 B2
(45) Date of Patent: Jul. 13, 2010

(54) BOOT FOR CONSTANT-VELOCITY UNIVERSAL JOINT

(75) Inventors: Hiroshi Kumazaki, Aichi-ken (JP); Satoshi Suzuki, Aichi-ken (JP); Osamu Takeuchi, Handa (JP)

(73) Assignees: Toyoda Gosei Co., Ltd., Aichi-pref. (JP); JTEKT Corporation, Osaka (JP)

( * ) Notice: Subject to any disclaimer, the term of this patent is extended or adjusted under 35 U.S.C. 154(b) by 110 days.

(21) Appl. No.: 12/078,197

(22) Filed: Mar. 27, 2008

(65) Prior Publication Data

US 2008/0258409 A1    Oct. 23, 2008

(30) Foreign Application Priority Data

Mar. 29, 2007  (JP)  ............... 2007-088794

(51) Int. Cl.
*F16J 15/52*    (2006.01)

(52) U.S. Cl. ..................... 277/636; 277/634

(58) Field of Classification Search ............... 277/634, 277/635, 636; 464/175; 285/236; 92/34
See application file for complete search history.

(56) References Cited

U.S. PATENT DOCUMENTS

| | | | | |
|---|---|---|---|---|
| 4,735,596 A | * | 4/1988 | Ukai et al. ............... | 464/175 |
| 5,236,394 A | * | 8/1993 | Collins et al. ............ | 464/175 |
| 6,328,498 B1 | | 12/2001 | Mersch | |
| 2005/0276656 A1 | * | 12/2005 | Lim et al. ................. | 403/56 |
| 2007/0166096 A1 | * | 7/2007 | Lim et al. ................. | 403/50 |

FOREIGN PATENT DOCUMENTS

| | | |
|---|---|---|
| EP | 0 565 344 | 10/1993 |
| GB | 598584 | 2/1948 |
| GB | 1 486 835 | 9/1977 |
| JP | U-6-73533 | 10/1994 |
| JP | A-2001-3950 | 1/2001 |

OTHER PUBLICATIONS

Extended European Search Report dated Sep. 15, 2008 in corresponding European patent application No. 08005069.3-1252.

* cited by examiner

*Primary Examiner*—Thomas B Will
*Assistant Examiner*—Gilbert Y Lee
(74) *Attorney, Agent, or Firm*—Posz Law Group, PLC

(57) ABSTRACT

A boot for constant-velocity universal joint includes a minor-diameter cylindrical portion, a major-diameter cylindrical portion, and a bellows. The bellows connects the minor-diameter cylindrical portion with the major-diameter cylindrical portion integrally, and includes a plurality of crests and roots, being made of a first crest, a first root, a second crest, a second root, and so on, which are disposed alternately in this order from one of the opposite ends that faces the minor-diameter cylindrical portion to the other one of the opposite ends that faces the major-diameter cylindrical portion. The bellows further includes a rising wall, which connects one of the opposite ends of the minor-diameter cylindrical portion that faces the bellows with a top of the first crest in the bellows, and which exhibits a rising angle of less than 45 degrees to an imaginary central line of the boot or that of the shaft.

1 Claim, 6 Drawing Sheets

BOOT FOR CONSTANT-VELOCITY UNIVERSAL JOINT

The present invention is based on Japanese Patent Application No. 2007-88,794, filed on Mar. 29, 2007, the entire contents of which are incorporated herein by reference.

BACKGROUND OF THE INVENTION

1. Field of the Invention

The present invention relates to a boot for constant-velocity universal joint. More particularly, it relates to a boot for constant-velocity universal joint, boot which covers constant-velocity universal joint, an indispensable component part for the joint of drive shaft for front-wheel-drive vehicle, to inhibit water and dust from coming in the joint element of constant-velocity universal joint.

2. Description of the Related Art

Constant-velocity universal joints have been used for driving-power transmission systems for transmitting driving power from automotive engines to drive wheels, in particular, for drive shafts for front-wheel-drive vehicles. The constant-velocity universal joints have been provided with boots installed for sealing greases for lubricating the joint elements therein, and for inhibiting water and dust from coming in the joint elements.

For example, Japanese Unexamined Patent Publication (KOKAI) Gazette No. 2001-3,950 discloses a conventional boot for such constant-velocity universal joints, one of known conventional boots therefor. As illustrated in FIG. 5, the conventional boot comprises a major-diameter cylindrical portion 81, a minor-diameter cylindrical portion 82, and a bellows 83. The major-diameter cylindrical portion 81 is fastened to a not-shown joint outer race. The minor-diameter cylindrical portion 82 has a smaller inside and outside diameters than those of the major-diameter cylindrical portion 81, and is fastened to a shaft 91 by a fastener fitting 90, such as clamp or band. The bellows 83 connects the major-diameter cylindrical portion 81 with the minor-diameter cylindrical portion 82 integrally, and is formed as a truncated cone shape substantially.

When the conventional boot for constant-velocity universal joint is put in service, it rotates together with the joint outer race, to which the major-diameter cylindrical portion 81 is fastened, and together with the shaft 91, to which the minor-diameter cylindrical portion 82 is fastened. Then, as shown in FIG. 5, when the shaft 91 inclines nearer with respect to the joint outer race to change an angle that the joint outer race and the shaft 91 make (hereinafter referred to as "joint angle"), the bellows 83, which rotates together with the joint outer race and shaft 91, deforms in compliance with the changing joint angle, thereby sealing the joint element of constant-velocity universal joint.

Note that a general conventional boot for constant-velocity universal joint comprises a rising wall 85, which extends from one of the opposite ends of the minor-diameter cylindrical portion 82 that faces the bellows 83 and to the top of the first crest 84 of the bellows 83. Moreover, the rising wall 85 exhibits a rising angle "θ," which has been usually set to fall in a range of from 65 to 85 degrees approximately, to an imaginary central line of the general conventional boot or that of the shaft 91.

However, when the constant-velocity universal joint rotates at a large joint angle, the conventional constant-velocity universal-joint boot, which has been deformed to bend or curve greatly, rotates together with the constant-velocity universal joint. Accordingly, the rising wall 85 has been deformed greatly. Consequently, the conventional boot might have been associated with the following problems.

For example, when the shaft 91 inclines more with respect to the joint outer race, a curvature point upon curving or bending the conventional constant-velocity universal-joint boot deviates more from the center in the axial direction of the boot and comes nearer to the side of the major-diameter cylindrical portion 81, which is disposed closer to the joint element between the joint outer race and the shaft 91. Moreover, when the conventional boot is curved or bent, compression stress acts onto the conventional boot on a joint-angle narrowing-down side (i.e., the right-hand side of FIG. 5, that is, the shaft 91 inclines nearer with respect to the joint outer race); and tensile stress acts onto it on the opposite joint-angle widening-up side (i.e., the left-hand side of FIG. 5).

As a result, on the compression side in which the joint angle narrows down, the crests of the bellows 83, which are disposed nearer to the major-diameter cylindrical portion 81, are compressed so that the roots, which are disposed nearer to the major-diameter cylindrical portion 81, are pulled in diametrically inward. Therefore, in the bellows 83, which is disposed nearer to the minor-diameter cylindrical portion 82, a compression-side section 84a of the first crest 84, which neighbors on the minor-diameter cylindrical portion 82, has come to fall down toward the major-diameter cylindrical portion 81, even though the compression-side section 84a is present on the compression side in which the joint angle narrows down.

On the other hand, on the tensile side in which the joint angle widens up, large tensile force acts onto the bellows 83, which is disposed nearer to the major-diameter cylindrical portion 81. However, since the facing compression-side section 84a falls down toward the major-diameter cylindrical portion 81 as described above, an opposite tensile-side section 84b of the first crest 84, which neighbors on the minor-diameter cylindrical portion 82, has come to fall down toward the minor-diameter cylindrical portion 82, even though the tensile-side section 84b is present on the tensile side in which the joint angle widens up.

When the thus bent or curved conventional constant-velocity universal-joint boot rotates, the first crest 84 of the bellows 83, which neighbors on the minor-diameter cylindrical portion 82, is put in such a state that the compression-side section 84a falls down toward the major-diameter cylindrical portion 81, and in such a state that the tensile-side section 84b falls down toward the minor-diameter cylindrical portion 82, alternately and repetitively. Accordingly, the rising wall 85 has come to be put in such a state that it falls down to exhibit a diminishing rising angle when it coincides with a compression-side section 85a, and in such a state that it gets up to exhibit an enlarging rising angle when it coincides with a tensile-side section 85b, alternately and repetitively. Consequently, as illustrated in FIG. 6, the fastener fitting 90 has come to be put in such a state that it sinks downward at a compression-side section 82a, and in such a state that it floats upward at a tensile-side section 82b, alternately and repetitively, in one of the opposite ends of the minor-diameter cylindrical portion 82 that neighbors on the bellows 83.

Under the circumstances, the larger the joint angle, which the joint outer race and shaft 19 make, becomes, the greater the first crest 84 of the bellows 83, which neighbors on the minor-diameter cylindrical portion 82, inclines. Accordingly, the rising wall 85 of the bellows 83 deforms more greatly so that the fastener fitting 90 sinks downward and floats upward more greatly. Consequently, the one of the opposite ends of the minor-diameter cylindrical portion 82, which is disposed on the side of the bellows 83, is subjected to a pumping action that pulls in grease, which is held inside the conventional boot for constant-velocity universal joint, toward the minor-diameter cylindrical portion 82 and then discharges the grease to the outside of the conventional boot. As a result, there might be such a fear that grease leakage occurs.

In the meantime, Japanese Unexamined Utility Model Publication (KOKAI) Gazette No. 6-73,533 discloses a boot for constant-velocity universal joint, boot which is provided with a retaining cylindrical portion. The retaining cylindrical portion is formed by enlarging the axial length of the minor-diameter cylindrical portion, and is thereby disposed nearer to a part of the minor-diameter cylindrical portion, which adjoins the bellows, than the fastener fitting, which is placed adjacent to the opening end of the minor-diameter cylindrical portion, is disposed. In this conventional boot, it is believed that it might be possible to solve the aforementioned grease-leakage problem because the retaining cylindrical portion, which is disposed nearer to the bellows than the fastener fitting is disposed, exists in the minor-diameter cylindrical portion.

However, the conventional boot for constant-velocity universal joint that is disclosed in Japanese Unexamined Utility Model Publication (KOKAI) Gazette No. 6-73,533 has upsized, because it comes to have an axial length that is prolonged by an axial length of the retaining cylindrical portion. On the other hand, in order to inhibit the conventional boot from upsizing, the bellows should have an axial length that is shortened by an axial length of the retaining cylindrical portion. As a result, the resulting shortened bellows might exhibit degraded durability, or it might have become difficult to give the resultant shortened bellows necessary functions securely.

SUMMARY OF THE INVENTION

The present invention has been developed in view of the aforementioned circumstances. It is therefore an object of the present invention to provide a boot for constant-velocity universal joint, boot which is provided with a countermeasure for grease leakage, while not only inhibiting it from upsizing but also inhibiting its bellows from exhibiting degraded durability and functions.

A boot for constant-velocity universal joint according to the present invention solves the aforementioned problems, and comprises:

a minor-diameter cylindrical portion having opposite ends and inside and outside diameters, and being retained to a shaft;

a major-diameter cylindrical portion having opposite ends and inside and outside diameters that are larger than the inside and outside diameters of the minor-diameter cylindrical portion, and being disposed separately away from the minor-diameter cylindrical portion and coaxially therewith;

a bellows connecting the minor-diameter cylindrical portion with the major-diameter cylindrical portion integrally, and having opposite ends and an overall outer configuration being formed as a truncated cone shape substantially;

the bellows comprising a plurality of crests and roots being made of a first crest, a first root, a second crest, a second root, and so on, which are disposed alternately in this order from one of the opposite ends that faces the minor-diameter cylindrical portion to the other one of the opposite ends that faces the major-diameter cylindrical portion; and the bellows further comprising a rising wall connecting one of the opposite ends of the minor-diameter cylindrical portion that faces the bellows with a top of the first crest in the bellows, and exhibiting a rising angle of less than 45 degrees to an imaginary central line of the boot or that of the shaft.

The present boot for constant-velocity universal joint comprises the rising wall. The rising wall extends from one of the opposite ends of the minor-diameter cylindrical portion, which faces the bellows, to the first crest of the bellows. Moreover, the rising wall exhibits a rising angle of less than 45 degrees to an imaginary central line of the present boot or that of the shaft. Accordingly, when the bent or curved present boot rotates, the rising wall gets up in such a direction that the rising angle becomes larger on the tensile side, but exhibits smaller get-up magnitude. Consequently, even when the present boot, which has been bent or curved greatly, rotates, the rising wall can inhibit one of the opposite ends of the minor-diameter cylindrical portion, which faces the bellows, from floating upward. Therefore, the rising wall enables the present boot to prevent the grease leakage, which results from the pumping action, from occurring.

Note herein that, when a boot for constant-velocity universal joint comprises a rising wall whose rising angle is 45 degrees or more, it might become difficult to inhibit such a rising wall from getting up when the bent or curved boot rotates.

The present boot for constant-velocity universal joint comprises the rising wall exhibiting a reduced rising angle that is devised as a countermeasure against the grease leakage. Accordingly, unlike the conventional boot for constant-velocity universal joint that is provided with the retaining cylindrical portion, the present boot hardly exhibits a prolonged overall axial length, or its bellows scarcely exhibits a shortened axial length. Consequently, the present boot is free from such a problem that its entire construction has been upsized, or such a problem that the bellows has exhibited degraded durability or has performed degraded functions.

Note herein that, from the viewpoint of inhibiting the minor-diameter cylindrical portion from floating upward, the smaller rising angle "$\theta$" the rising wall exhibits the more desirable it is. However, if the rising wall should have exhibited a rising angle that is small too much, there might arise a fear that the bellows, which comprises such a rising wall, little demonstrates required vibration absorbing function. Therefore, the rising wall can preferably exhibit a rising angle of from 10 degrees or more to less than 45 degrees to an imaginary central line of the present boot or that of the shaft.

Moreover, the present boot for constant-velocity universal joint can preferably comprise the rising wall that exhibits the rising angle "$\theta$," which falls in a range of from 25 to 35 degrees. If such is the case, it is possible to effectively inhibit the rising wall whose rising angle falls in a range of from 25 to 35 degrees from getting up while keeping the bellows, which comprises the rising wall, demonstrating required vibration function usefully.

In the meantime, under such a fixed condition that no external force acts onto the bellows, an imaginary central line of the present boot for constant-velocity universal joint, or that of the shaft, and a first bellows-making wall, which connects the first crest's top with the first root's bottom, make an angle "$\alpha$." The angle "$\alpha$" also affects how the rising wall gets up. Specifically, let us consider a bellow that is configured ordinarily, that is, its first bellows-making wall exhibits the angle "$\alpha$," which falls in a range of from 40 to 60 degrees approximately, with respect to an imaginary central line of boot or that of shaft. Under such a fixed condition that no external force acts onto the bellows that is thus configured ordinarily, when the ordinarily configured bellows is compressed so that its first bellows-making wall deforms to exhibit the angle "α" that approaches 90 degrees from the initial 40-60 degrees, the rising wall of the ordinarily configured bellows gets up while displacing the top of the first crest of the ordinarily configured bellows diametrically outward, as the first bellows-making wall thus deforms. As a result, under such a fixed condition that no external force acts onto the ordinarily configured bellows, the closer the angle "α" is to 90 degrees the less the rising wall exhibits the degree of getting up that is accompanied by the deformation of the first bellows-making wall upon being compressed.

In view of the above fact, the present boot for constant-velocity universal joint can preferably comprise the bellows that further comprises a first bellows-making wall, which connects the top of the first crest with a bottom of the first root, and which exhibits an angle "α" falling in a range of from 85 to 95 degrees to an imaginary central line of the present boot or that of the shaft under such a fixed condition that the minor-diameter cylindrical portion is retained to the shaft and the major-diameter cylindrical portion is retained to a mating member (and under such a fixed condition that no external force acts onto the bellows). Moreover, the first bellows-making wall and the imaginary central line can especially preferably make the angle "α," which is set at 90 degrees. The first bellows-making wall whose angle "α" falls in a range of from 85 to 95 degrees can inhibit the rising wall from getting up usefully.

Note that, when molding a bellows by means of blow molding, it might be difficult to mold its first bellows-making wall so as to exhibit the angle "α," which exceeds 90 degrees (or to mold its first bellows-making wall so that it comes under diametrically inward with respect to the rising wall. If such is the case, it is allowable to mold a first bellows-making wall, which exhibits the angle "α" that is set at 90 degrees or less, upon blow molding, and then to subject the resulting bellows to axial preliminary compression so that the resultant first bellows-making wall exhibits the angle "α" that exceeds 90 degrees after a completed constant-velocity universal-joint boot's minor-diameter cylindrical portion and major-diameter cylindrical portion are fixed to a shaft and a mating member respectively.

Therefore, the present boot for constant-velocity universal joint can use fully inhibit grease from leaking while not only keeping itself from upsizing but also prohibiting its bellows from exhibiting degraded durability and functions.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
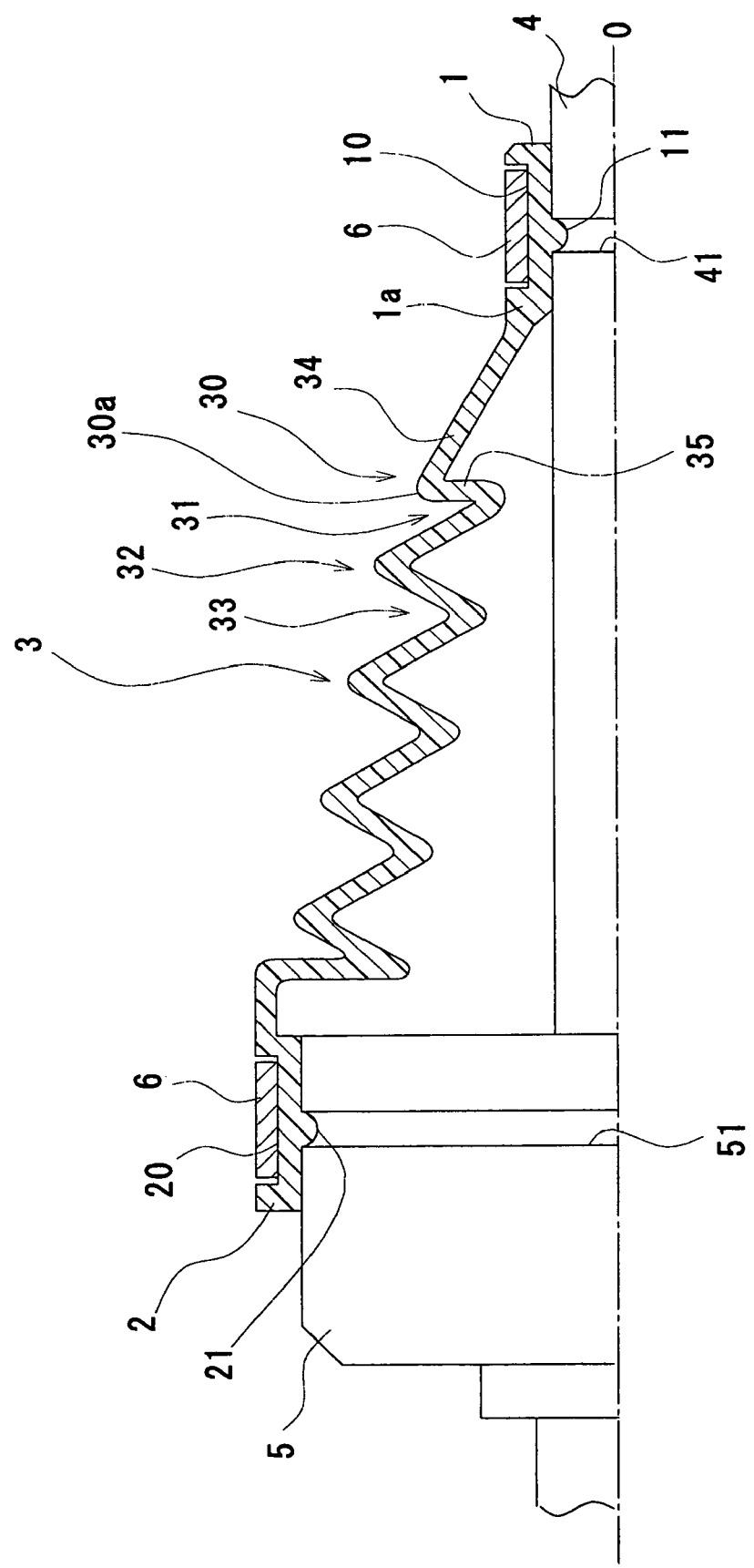
FIG. 1 is a partial axial cross-sectional diagram for partially illustrating a boot for constant-velocity universal joint according to Embodiment of the present invention that is fixed to a shaft and a mating member, and is a view taken by cutting the present boot according to Embodiment with an imaginary plane involving its imaginary central line.

Having generally described the present invention, a further understanding can be obtained by reference to the specific preferred embodiments which are provided herein for the purpose of illustration only and not intended to limit the scope of the appended claims.

Example

Hereinafter, a specific example of a boot for constant-velocity universal joint according to the present invention will be described in detail while referring to the drawings.

Figure 2:
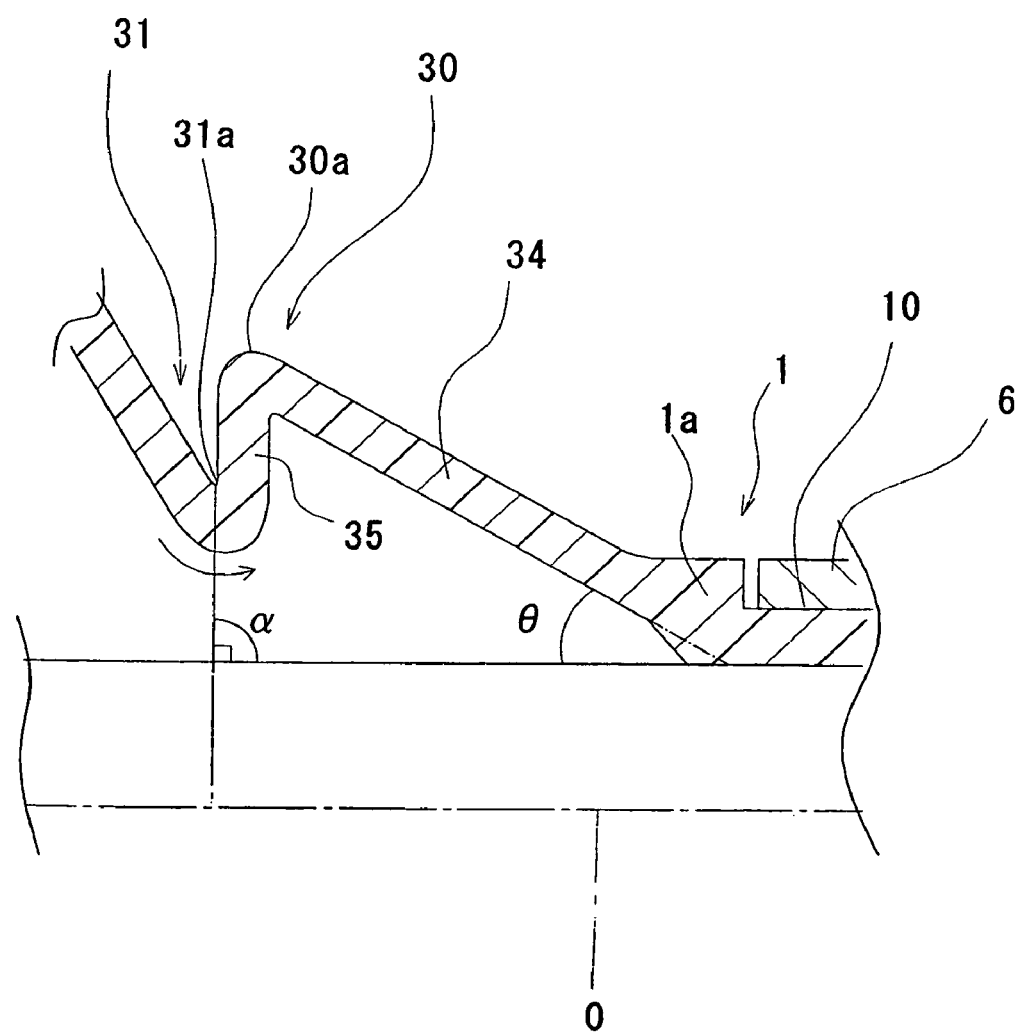
FIG. 2 is directed to the present boot according to Embodiment, and is a partially-enlarged axial cross-sectional diagram for illustrating a major portion of FIG. 1 in a partially-enlarged cross-sectional view.
Figure 3:
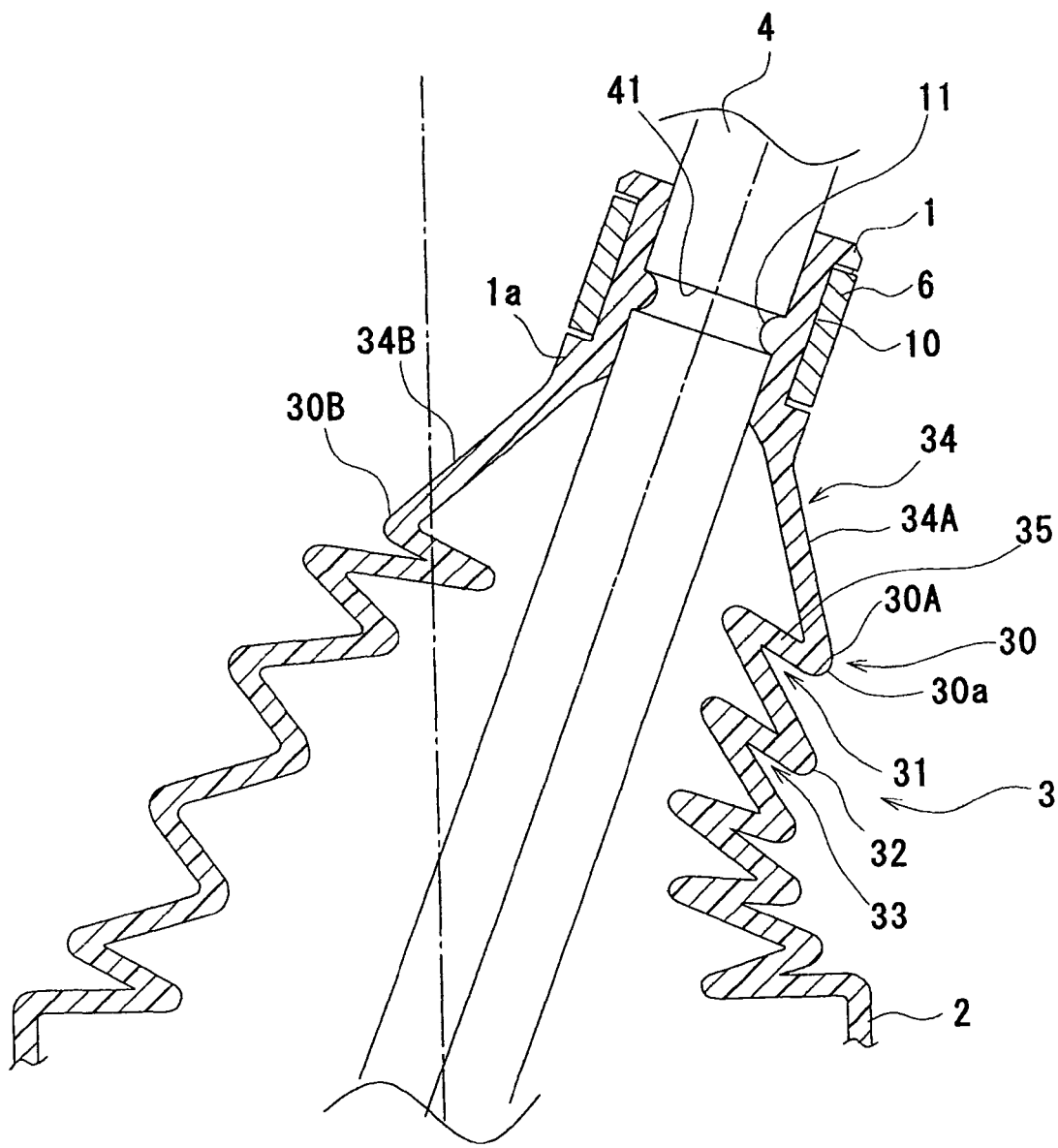
FIG. 3 is a cross-sectional diagram for illustrating the present boot according to Embodiment in service.

FIG. 1 illustrates a boot for constant-velocity universal joint according to Embodiment of the present invention partially. The drawing shows how the present boot according to Embodiment appears when it is fixed to a shaft and a joint outer race (i.e., a mating member). Moreover, the drawing is a partial vertical cross-sectional view that is taken by cutting the present boot according to Embodiment with an imaginary plane involving its imaginary central line "O." FIG. 2 is a partially-enlarged cross-sectional diagram for illustrating a major part of FIG. 1 in a partially-enlarged cross-sectional view. FIG. 3 is a cross-sectional diagram for illustrating the present boot according to Embodiment how it appears in service.

As illustrated in FIG. 1, the present boot according to Embodiment comprises a minor-diameter cylindrical portion 1, a major-diameter cylindrical portion 2, and a bellows 3. The major-diameter cylindrical portion 2 is disposed separately away from and coaxially with the minor-diameter cylindrical portion 1, and exhibits inside and outside diameters that are larger than those of the minor-diameter cylindrical portion 1. The bellows 3 connects the minor-diameter cylindrical portion 1 with the major-diameter cylindrical portion 2 integrally, and has an overall outer configuration that is formed as a truncated cone shape.

The present boot according to Embodiment is formed of thermoplastic resin integrally. As for the thermoplastic resin, it is possible to use a simple thermoplastic elastomer, such as polyester elastomers, polyurethane elastomers, polyamide elastomers and polyolefin elastomers, or to use a blended elastomer comprising two or more of the specific elastomers. Moreover, in order to mold the present boot according to Embodiment integrally, it is possible to employ one of the following known manufacturing processes: press blow molding, extrusion blow molding, injection blow molding and injection molding, for instance.

Note that, in such a natural state that no external force acts onto the present boot according to Embodiment, the minor-diameter cylindrical portion 1, the major-diameter cylindrical portion 2, and the bellows 3 are placed concentrically to each other about the imaginary central line "O" of the present boot according to Embodiment or that of the shaft 4.

As illustrated in FIG. 1, an outer peripheral surface of the minor-diameter cylindrical portion 1 is provided with an annular clamping groove 10. The annular clamping groove 10 engages with a fastener fitting 6, such as metallic band or clamp. Moreover, the inner peripheral surface of the minor-diameter cylindrical portion 1 is provided with an annular protrusion 11. The annular protrusion 11 engages with an annular groove 41 of the shaft 4, and has a cross section that is formed as an arc shape. Likewise, an outer peripheral surface of the major-diameter cylindrical portion 2 is provided with an annular clamping groove 20. The annular clamping groove 20 engages with another fastener fitting 6, such as metallic band or clamp. Moreover, the inner peripheral surface of the major-diameter cylindrical portion 2 is provided with an annular protrusion 21. The annular protrusion 21 engages with an annular groove 51 of the joint outer race 5, and has a cross section that is formed as an arc shape.

The bellows 3 comprises a plurality of crests and roots, which are formed alternately. For example, the bellows 3 comprises a first crest 30, a first root 31, a second crest 32, a second root 33, and so on, which are disposed in this order from an opposite end 1a of the minor-diameter cylindrical portion 1, which faces the bellows 3, to an opposite end of the major-diameter cylindrical portion 2, which faces the bellows 3 and minor-diameter cylindrical portion 1. Moreover, the bellows 3 comprises a rising wall 34, which makes a part of the first crest 30. The rising wall 34 connects the opposite end 1a of the minor-diameter cylindrical portion 1, which faces the bellows 3, with the top 30a of the first crest 30.

Note herein that, as illustrated in FIG. 2, the present boot according to Embodiment comprises the rising wall 34, which exhibits a rising angle "θ" to the imaginary central line "O" of the present boot according to Embodiment or that of the shaft 4. Moreover, the rising angle "θ" was set at 30 degrees in such a natural state that no external force acts onto the present boot according to Embodiment.

Moreover, as shown in FIG. 2, the present boot according to Embodiment comprises a first bellows-making wall 35, which connects the top 30a of the first crest 30 with the bottom 31a of the first root 31. In addition, the first bellows-making wall 35 and the imaginary central line "O" of the present boot according to Embodiment or that of the shaft 4 made an angle "α" that was set at 90 degrees in such a natural state that no external force acts onto the present boot according to Embodiment.

The present boot according to Embodiment is put in service in the following manner: the minor-diameter cylindrical portion 1 is fitted around the shaft 4; and the major-diameter cylindrical portion 2 is fitted around a joint outer race 5, the mating member. In the thus fixed state, the minor-diameter cylindrical portion 1 is held in position, because not only is it fastened by the fastener fitting 6, which is disposed within the clamping groove 10, but also its inner annular protrusion 11 engages with the annular groove 41 of the shaft 4. Moreover, the major-diameter cylindrical portion 2 is held in position, because not only is it fastened by the fastener fitting 6, which is disposed within the clamping groove 20, but also its inner annular protrusion 21 engages with the annular groove 51 of the joint outer race 5.

The thus constructed present boot according to Embodiment comprises the rising wall 34, which exhibits the rising angle "θ" being set at 30 degrees to the imaginary central line of the present boot or that of the shaft 4. Accordingly, even when the curved or bent present boot according to Embodiment rotates, it can inhibit the rising wall 34 from getting up in such a direction that the rising angle "θ" enlarges on the above-described tensile side.

Specifically, as illustrated in FIG. 3, when the shaft 4 inclines nearer with respect to the joint outer race 5, the inclining shaft 4 curves or bends the present boot according to Embodiment. Accordingly, the present boot according to Embodiment is subjected to compression stress on the side of narrowing-down joint angle, that is, on the right-hand side of FIG. 3 in which the shaft 4 inclines nearer to the joint outer race 5. On the contrary, the present boot according to Embodiment is subjected to tensile stress on the side of widening-up joint angle, that is, on the left-hand side of FIG. 3 in which the shaft 4 inclines more away from the joint outer race 5. Under the circumstances, the crests of the bellows 3, which are adjacent to the major-diameter cylindrical portion 2 and are located nearer to the curved or bent point of the bellows 3, are compressed to pull the roots diametrically inward on the compression side in which the joint angle narrows down. Accordingly, a compression-side section 30A of the first crest 30, that is, one of the crests of the bellows 3 that are located on the compression side in which the joint angle narrows down and are adjacent to the minor-diameter cylindrical portion 1, falls down toward the major-diameter cylindrical portion 2. Consequently, a compression-side section 34A of the rising wall 34 falls down in such a direction that the rising angle "θ" becomes smaller.

In the meanwhile, on the tensile or stretched side in which the joint angle widens up, a tensile-side section 34B of the rising wall 34, which is located oppositely to the compression-side section 34A, tries to get up in such a direction that the rising angle "θ" becomes greater, because the compression-side section 34A of the rising wall 34 falls down in such a direction that the rising angle "θ" becomes smaller on the opposite compression side. However, since the present boot according to Embodiment comprises the rising wall 34 whose rising angle "θ" is set at as small as 30 degrees, it can effectively inhibit such a phenomenon itself from arising that the tensile-side section 34B of the rising wall 34 gets up.

Moreover, under such a fixed condition that no external load acts onto the bellows 3, the present boot according to Embodiment comprises the first bellows-making wall 35, which exhibits the angle "α" that is set at 90 degrees to the imaginary central line "O" of the present boot or that of the shaft 4. As a result, even when the first bellows-making wall 35 deforms, the rising wall 34 is not at all subjected to such stress that is accompanied by the deforming first bellows-making wall 35 and that tries to get up the rising wall 34 while displacing the top 30a of the first crest 30 diametrically outward.

It is for this reason that, even when the greatly curved or bent present boot according to Embodiment rotates, it can inhibit such a phenomenon itself from arising that a part of the rising wall 34, which coincides with the tensile-side section 34B, gets up, and thereby it is feasible to prevent the opposite end 1a of the minor-diameter cylindrical portion 1, which adjoins the bellows 3, from floating upward. Therefore, the present boot according to Embodiment can inhibit the pumping action resulting from the fact that the opposite end 1a of the minor-diameter cylindrical portion 1, which adjoins the bellows 3, floats upward and sinks downward from occurring, and thereby it is feasible to prevent grease from leaking.

Moreover, the present boot according to Embodiment comprises the rising wall 34, which exhibits the reduced rising angle "θ," the countermeasure against grease leakage. Accordingly, unlike the second conventional boot for constant-velocity universal joint, it is not at all necessary to separately provide the present boot according to Embodiment with a retaining cylindrical portion. Consequently, the present boot according to Embodiment hardly suffers from such a problem that the entire construction has exhibited a prolonged axial length, or that the bellows 3 has exhibited a shortened axial length. Therefore, the present boot according to Embodiment is neither upsized, nor comprises such a bellows 3 that demonstrates degraded durability and functions.

It follows that the present boot according to Embodiment can inhibit the grease leakage from occurring while not only avoiding upsizing but also little degrading the durability and functions of the bellows 3.

Evaluation for Grease Leakage by FEA

The present boot according to Embodiment was subjected to a simulation for evaluating how much hours it took when grease leakage occurred eventually. Note that the simulation was conducted by means of finite element analysis, one of the finite element methods, and was actually carried out under the following conditions:

Joint Angle, an angle that the joint outer race 5 and the shaft 4 made: 20 degrees;
Ambient Temperature: Room Temperature; and
Number of Revolutions: 600 rpm.

For comparison, a conventional boot for constant-velocity universal joint was prepared, and was likewise subjected to the simulation for the grease-leakage evaluation. Note that the conventional boot was formed as the same configuration as that of the present boot according to Embodiment, and was manufactured from the same material as that made the present boot according to Embodiment, except the following features. That is, the conventional boot comprised a rising wall 34 that exhibited a rising angle "θ" being set at 70 degrees to the imaginary central line "O" of the conventional boot or that of the shaft 4, and further comprised a first bellows-making wall 35 whose angle "α" was set at 50 degrees to the same.

Figure 4:
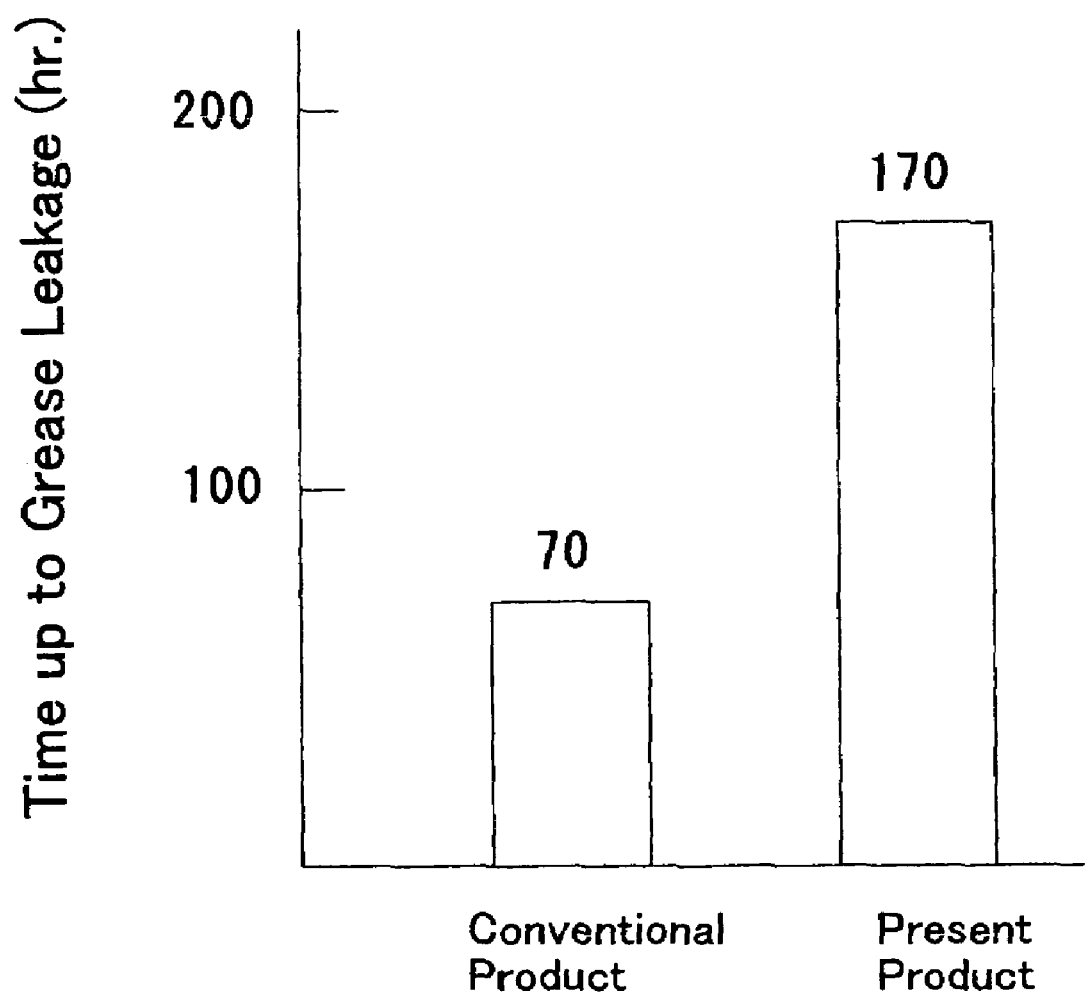
FIG. 4 is a diagram for illustrating results of grease-leakage evaluation, which was carried out by means of finite element analysis (hereinafter abbreviated to as "FEA" wherever necessary), on the present boot according to Embodiment and a conventional boot for constant-velocity universal joint.
Figure 5:
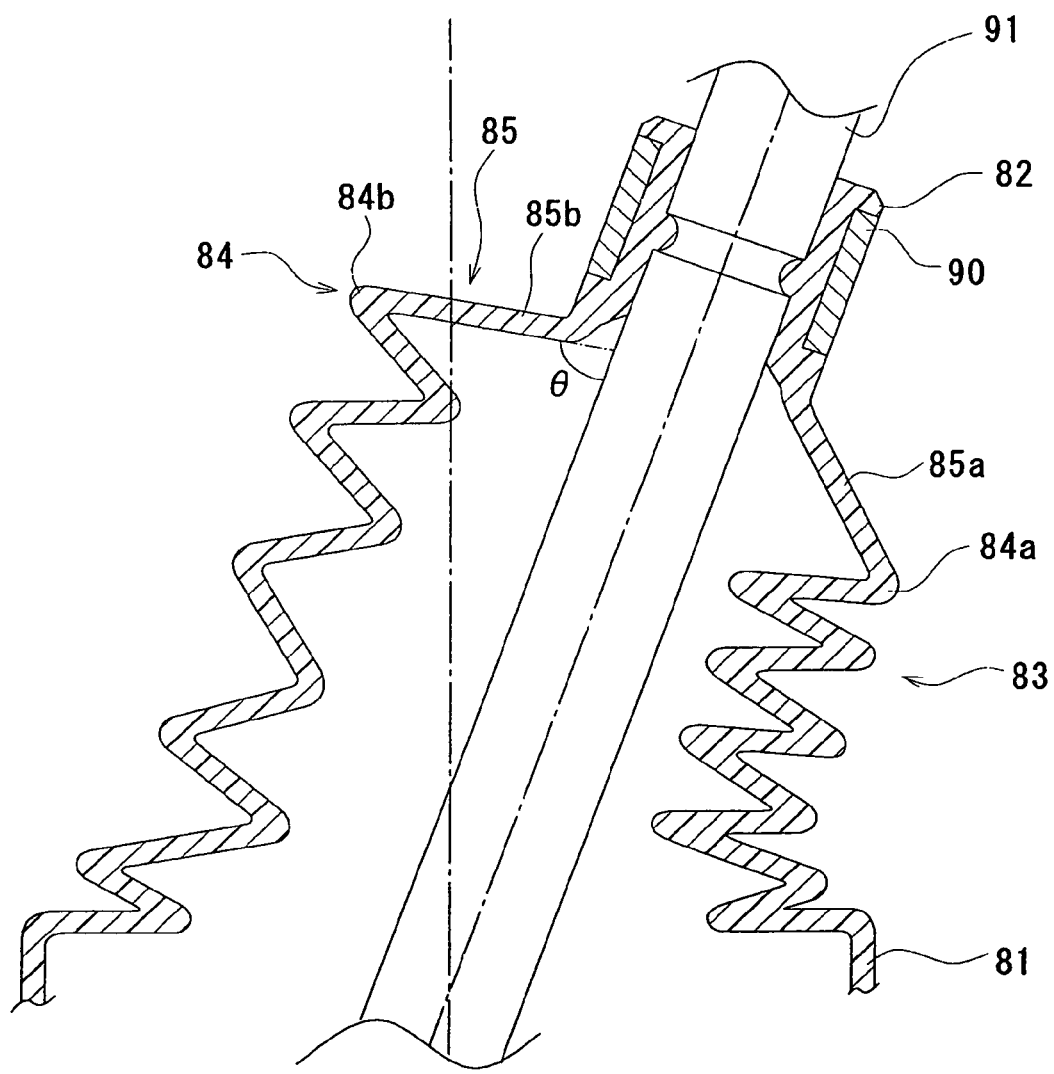
FIG. 5 is a cross-sectional diagram for illustrating how a conventional boot for constant-velocity universal joint is used.
Figure 6:
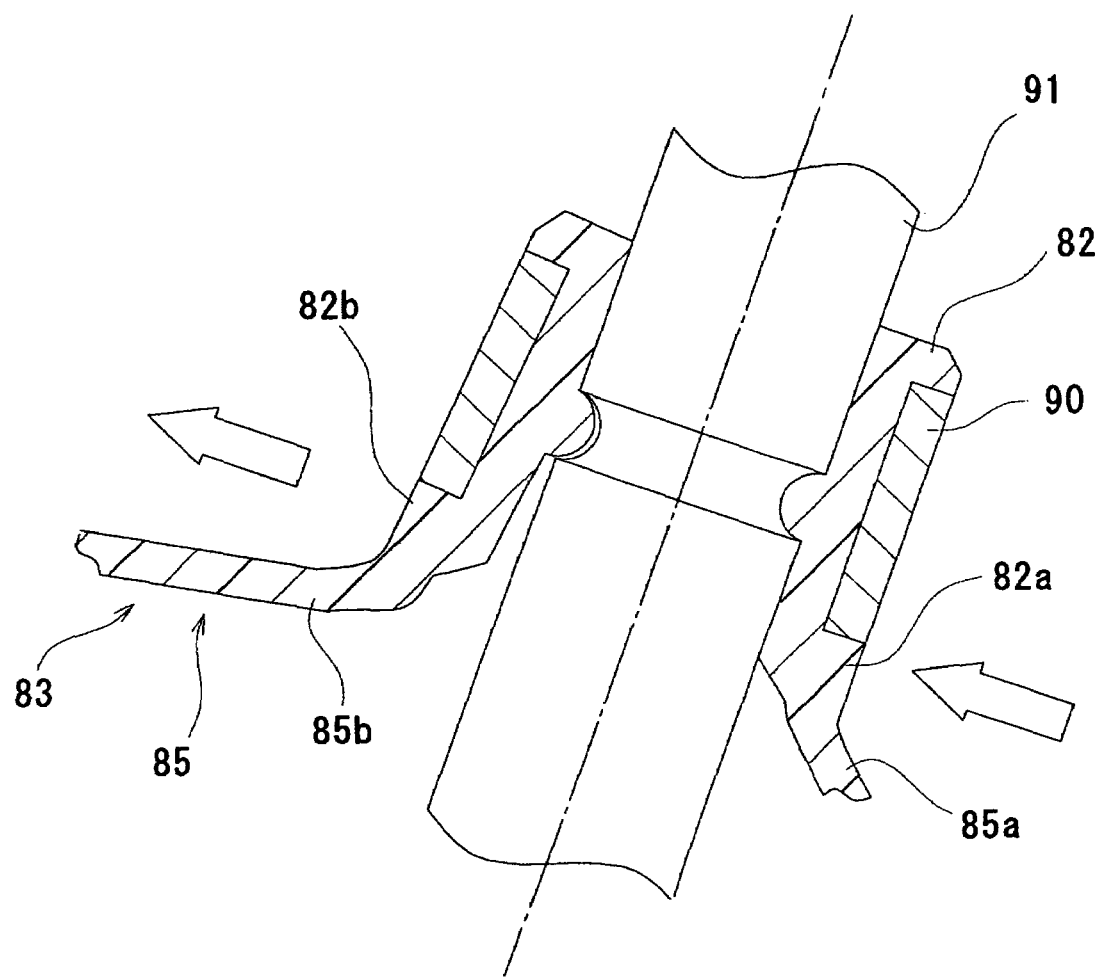
FIG. 6 is directed to the conventional boot, and is a partially-enlarged cross-sectional diagram for illustrating a major portion of the conventional boot and how pumping action occurs in it.

FIG. 4 illustrates the results of the grease-leakage evaluation on the present boot according to Embodiment and on the conventional boot. As shown in FIG. 4, the conventional boot, the conventional product designated in the drawing, suffered from grease leakage that occurred 70 hours after starting the simulation. On the other hand, it took 170 hours after starting the simulation until grease leakage occurred in the present boot according to Embodiment. Therefore, it was ascertained that the constituent elements, the rising wall 34 whose rising angle "θ" was reduced to 30 degrees and the first bellows-making wall 35 whose angle "α" was set at 90 degrees, enabled the present boot according to Embodiment to inhibit the grease leakage from arising.

Having now fully described the present invention, it will be apparent to one of ordinary skill in the art that many changes and modifications can be made thereto without departing from the spirit or scope of the present invention as set forth herein including the appended claims.

What is claimed is:

1. A boot for a constant-velocity universal joint, the boot comprising:
    a minor-diameter cylindrical portion having opposite ends and inside and outside diameters, and being retained to a shaft;
    a major-diameter cylindrical portion having opposite ends and inside and outside diameters that are larger than the inside and outside diameters of the minor-diameter cylindrical portion, and being disposed separately away from the minor-diameter cylindrical portion and coaxially therewith;
    a bellows connecting the minor-diameter cylindrical portion with the major-diameter cylindrical portion integrally, and having opposite ends and an overall outer configuration being formed in a truncated cone shape;
    the bellows comprising a plurality of crests and roots, including a first crest, a first root, a second crest, and a second root, disposed alternately in this order from one of the opposite ends that faces the minor-diameter cylindrical portion to the other one of the opposite ends that faces the major-diameter cylindrical portion; and
    the bellows further comprising a rising planar wall connecting one of the opposite ends of the minor-diameter cylindrical portion that faces the bellows with a top of the first crest in the bellows in an axial cross section, and exhibiting a rising angle falling in a range of from 25 to 35 degrees to an imaginary central line of the boot or that of the shaft; and
    the bellows further comprising a first bellows-making wall, which connects the top of the first crest with a bottom of the first root, and which exhibits an angle falling in a range of from 85 to 95 degrees to an imaginary central line of the boot or that of the shaft under such a fixed condition that the minor-diameter cylindrical portion is retained to the shaft and the major-diameter cylindrical portion is retained to a mating member.

* * * * *